United States Patent
Sexton et al.

(10) Patent No.: US 12,052,989 B2
(45) Date of Patent: *Aug. 6, 2024

(54) COMPOSITIONS COMPRISING ETHOXYLATED LECITHIN AND METHODS OF MAKING AND USING THE SAME

(71) Applicant: Exacto, Inc., Sharon, WI (US)

(72) Inventors: Franklin E. Sexton, Richmond, IL (US); Todd J. O'Connell, Wonder Lake, IL (US); Ryan T. Strash, Union Grove, WI (US)

(73) Assignee: Exacto, Inc., Sharon, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,704

(22) Filed: Jan. 17, 2023

(65) Prior Publication Data

US 2023/0148592 A1 May 18, 2023

Related U.S. Application Data (63) Continuation of application No. 16/555,637, filed on Aug. 29, 2019, now Pat. No. 11,553,711, which is a continuation of application No. 14/590,434, filed on Jan. 6, 2015, now abandoned.

(60) Provisional application No. 61/923,942, filed on Jan. 6, 2014.

(51) Int. Cl.
| | | |
|---|---|---|
| *A01N 25/30* | (2006.01) | |
| *A01N 25/06* | (2006.01) | |
| *A01P 13/00* | (2006.01) | |

(52) U.S. Cl.
CPC ............ *A01N 25/30* (2013.01); *A01N 25/06* (2013.01); *A01P 13/00* (2021.08)

(58) Field of Classification Search
CPC ........ A01N 25/30; A01N 25/06; A01N 37/40; A01N 43/40; A01N 43/90; A01N 57/20
See application file for complete search history.

(56) References Cited

U.S. PATENT DOCUMENTS

| | | |
|---|---|---|
| 2,310,679 A | 2/1943 | DeGroote et al. |
| 6,797,673 B1 | 9/2004 | Worthley et al. |
| 9,131,679 B2 | 9/2015 | Di Modugno et al. |
| 9,605,009 B2 | 3/2017 | Jirjis et al. |
| 10,060,038 B2 | 8/2018 | Carter et al. |
| 10,736,843 B1 | 8/2020 | Ahmed et al. |
| 11,553,711 B2 | 1/2023 | Sexton et al. |
| 2004/0171492 A1 | 9/2004 | Mainx et al. |
| 2006/0180677 A1 | 8/2006 | McManic |
| 2006/0257333 A1 | 11/2006 | Kauranen |
| 2013/0231429 A1 | 9/2013 | Sexton et al. |
| 2014/0264179 A1 | 9/2014 | Carter |
| 2014/0323312 A1 | 10/2014 | Sexton et al. |
| 2014/0323609 A1 | 10/2014 | Sexton et al. |
| 2014/0378554 A1 | 12/2014 | Sexton et al. |
| 2015/0045224 A1 | 2/2015 | Parrish |
| 2015/0189869 A1 | 7/2015 | Sexton et al. |

OTHER PUBLICATIONS

Composition of Soybean Lecithin—C.R. Scholfield—Journal of the American Oil Chemists' Society, vol. 58, No. 10 (Oct. 1981), p. 889-892.
Drexel PAS-800 Penetrant—Acidifier—Surfactant.
Loveland Products—LI 700—https://www.lovelandproducts.com/product/li-700.
N. Lourith and M. Kanlayavattanakul, "Natural surfactants used in cosmetics: glycolipids", International Journal of Cosmetic Science , 2009, 31, 255-261. (Year: 2009).

*Primary Examiner* — Mina Haghighatian
*Assistant Examiner* — Nathan W Schlientz
(74) *Attorney, Agent, or Firm* — Calderon, Safran & Wright P.C.

(57) ABSTRACT

Compositions are provided that include ethoxylated lecithin for use as an adjuvant in aqueous composition. Specifically, the compositions may be utilized primarily as drift reduction agents in agricultural compositions, as a soil or foliage penetrant, as a pesticide adjuvant, as a pesticide formulation component, and for other uses. More specifically, the compositions are useful in reducing drift in spray compositions, such as in use in agricultural applications, such as pesticide, herbicide, fungicide and insecticide formulations, in industrial vegetation management ("IVM") and integrated pest management ("IPM") applications, in rights-of-way applications, in forestry applications, and other like applications.

23 Claims, 12 Drawing Sheets

COMPOSITIONS COMPRISING ETHOXYLATED LECITHIN AND METHODS OF MAKING AND USING THE SAME

CROSS REFERENCE TO RELATED APPLICATIONS AND CLAIM OF PRIORITY

This is a continuation of application Ser. No. 16/555,637, filed Aug. 29, 2019, now U.S. Pat. No. 11,553,711, which is a continuation of application Ser. No. 14/590,434, filed Jan. 6, 2015, which claims the benefit of priority of provisional application 61/923,942 filed Jan. 6, 2014, the complete disclosure of which is incorporated herein by reference.

TECHNICAL FIELD

The present invention relates to compositions comprising ethoxylated lecithin for use as an adjuvant, especially aqueous compositions. For example, the compositions of the present invention may be utilized primarily as drift reduction agents in agricultural compositions, as a soil or foliage penetrant, as a pesticide adjuvant, as a pesticide formulation component, and for other uses. The compositions may be used in reducing drift in spray compositions, such as in use in agricultural applications, such as pesticide, herbicide, fungicide and insecticide formulations, in industrial vegetation management ("IVM") and integrated pest management ("IPM") applications, in rights-of-way applications, in forestry applications, and other like applications.

BACKGROUND

The spraying of compositions for particular purposes is well known in the art. For example, the agriculture industry has sprayed compositions onto agriculture for decades if not centuries to apply useful chemicals and compositions to agricultural crops. Specifically, it is well known to spray pesticides, herbicides, insecticides, fungicides, and other like functional components onto agricultural crops and/or soils to ward off and/or eliminate harmful insects, weeds, fungi and other like harmful elements. Fertilizers are also sprayed onto agricultural crops and/or soils to supplement or replenish nutrients to crops and soils.

Moreover, spray compositions are utilized to aid in IVM and IPM applications for reduction of disease and pest vectors, in rights-of-way applications, in forestry applications, and in other like applications. The spraying of compositions has far-reaching applications beyond merely spraying on agricultural crops.

Droplet sizes of sprayed compositions are important to ensure that intended targets, such as agricultural crops and/or soils, are adequately treated. To ensure the adequate deposition of functional compositions, sprays strike a balance between having droplet sizes that are small and light enough to be sprayed maximal distances, but heavy enough so that the droplets do not get carried away by wind or otherwise drift outside the intended application area. A need therefore exists for compositions that may be effectively sprayed onto intended target areas. Specifically, a need exists for compositions that form droplet sizes that are appropriately sized to maximize coverage of an intended target area.

Drift, as noted above, may cause compositions to be applied to unintended areas, such as environmentally sensitive areas, and may become pollutants. For example, pesticides, insecticides, herbicides, and fungicides may pose a hazard to unintended areas, and may disrupt ecosystems. Likewise, fertilizers may pose a risk if applied to unintended areas, also becoming pollutants. Drift of compositions to unintended areas or untargeted areas increases the cost of application as more composition must be used to cover intended areas than would otherwise be required. A need exists for compositions that may be easily controlled to spray onto intended areas while minimally affecting environmentally sensitive areas.

Equipment utilized to spray compositions may have a large effect on droplet sizes, but composition formulation can also be important. Prior known compositions have utilized high molecular weight polymers, such as polyacrylamides and polysaccharides, such as guar, to increase viscosity of compositions. However, these compositions may be difficult to process, may provide inadequate control over droplet sizes and can easily breakdown in high shear environments, such as in mixing tanks and the like. A need, therefore, exists for drift reduction compositions that provide adequate droplet size control but do not easily break down under high shear conditions.

Soya lecithin has been identified as an aid in reducing droplet sizes in spray compositions. For example, U.S. Pat. No. 6,797,673 indicates that Drexel Chemical Co.'s PAS-800™ contains lecithin in an acidic composition. Lecithin, however, is difficult to utilize or stabilize in aqueous solutions. Therefore, it has been proposed to use surfactant systems with lecithin to allow the drift reduction agent (also known as a drift control agent) to more easily dissolve into aqueous solutions and form aqueous spray compositions. Surfactants, however, have the adverse effect of increasing driftable fines, thus at least partly defeating the purpose of including lecithin in the first place.

To the inventors' knowledge, ethoxylated lecithin (the reaction product of lecithin and ethylene oxide) has heretofore not been used in compositions to aid in controlling drift or as a penetrant, or in any other manner as an adjuvant in agricultural compositions, such as in use in pesticide, herbicide, fungicide, insecticide or fertilization applications, or for any other agricultural application.

BRIEF SUMMARY

According to an aspect of the present invention, compositions are provided that include at least ethoxylated lecithin (the reaction product of lecithin and ethylene oxide) for use primarily as a drift reduction agent in agricultural compositions, as a soil or foliage penetrant, as a pesticide adjuvant, as a pesticide formulation component, and/or for other uses. The compositions may be useful in reducing drift in spray compositions, such as in use in agricultural applications, such as pesticide, herbicide, fungicide and insecticide formulations, in IVM and IPM applications, in rights of way applications, in forestry applications, and other like applications.

To this end, in an aspect of the present invention, a composition comprising ethoxylated lecithin and one or more stabilizing components is provided. In an embodiment, the ethoxylated lecithin composition may be combined with one or more functional components and water for spraying for agricultural applications. The one or more functional components may include a pesticide, an insecticide, a herbicide, a fungicide, or a fertilizer, or one or more combinations thereof.

In accordance with certain embodiments, the compositions may be effectively sprayed onto intended target areas.

In accordance with embodiments, the compositions form droplet sizes that are appropriately sized to improve or maximize coverage of an intended target area.

In accordance with embodiments, the compositions may be easily controlled to spray onto intended areas while minimally affecting environmentally sensitive areas.

Further, in accordance with some embodiments, the compositions are improved drift reduction compositions that provide adequate droplet size control but do not easily break down under high shear conditions.

In accordance with some embodiments, the compositions are improved drift reduction compositions for spray applications comprising one or more drift reduction agents that are adequately stabilized in aqueous systems without complicated surfactant systems, or preferably without or substantially without any surfactants other than the ethoxylated lecithin, which has surfactant-like water-dispersion properties without the drawback of increasing driftable fines that plagues conventional surfactants.

In accordance with some embodiments, ethoxylated lecithin is utilized as an agricultural adjuvant.

In accordance with some embodiments, ethoxylated lecithin is an agricultural adjuvant for use as a drift reduction agent and/or a penetrant.

Additional embodiments, features and advantages of the present invention are described in, and will be apparent from, the detailed description of the presently exemplary embodiments and from the drawings.

BRIEF DESCRIPTION OF THE DRAWINGS

The drawing figures depict one or more implementations in accordance with the present concepts, by way of example only, not by way of limitations. The figures are incorporated in and constitute part of this specification. In the figures, like reference numerals refer to the same or similar elements.

DETAILED DESCRIPTION OF THE EXEMPLARY EMBODIMENTS

Exemplary embodiments relate to compositions comprising ethoxylated lecithin for use as an adjuvant in aqueous composition. Specifically, the compositions may be utilized primarily as drift reduction agents in agricultural compositions, as a soil or foliage penetrant, as a pesticide adjuvant, as a pesticide formulation component and for other uses. The embodied compositions may be useful in reducing drift in spray compositions, such as in use in agricultural applications, for example, as pesticide, herbicide and insecticide formulations, in IVM and IPM applications, in rights of way applications, in forestry applications, and other like applications.

The exemplary compositions comprise an amount of ethoxylated lecithin and other component(s) to form a mixture. The compositions may be incorporated into aqueous compositions further comprising a functional component, such as one or more pesticides, one or more insecticides, one or more herbicides, one or more fungicides, one or more fertilizers, and/or one or more other functional components desired to be applied to an object, such as an agricultural crop, and/or to an area of soil for penetration of the mixture into the plant and/or the soil. The other compositions may optionally include one or more surfactants, one or more fatty acids, one or more viscosity modifying components, one or more acidifiers, one or more buffers, one or more defoamers, one or more wetting agents, one or more sticking agents, one or more tank cleaners, and/or one or more other components, particularly like components and components consistent with the intended use of the compositions.

The ethoxylated lecithins may preferably be relatively low molecular weight polymers and may be the reaction products of lecithin and ethylene oxide. The production of ethoxylated lecithin is known and is described in, for example, U.S. Pat. No. 2,310,679.

Ethoxylated lecithin is also commercially available, for example, from CST Performance Products Corp. in Conroe, Texas Ethoxylated lecithin from this commercial source is understood by the present Applicant to be an ethoxylated phospholipid-enriched soybean oil obtained from ethoxylating a soybean oil containing from 5-30 wt %, preferably 8-10 wt %, and more preferably about 10 wt % phospholipids. The phospholipid-enriched soybean oil is a fluid under ambient temperature and pressure. Ethoxylation may be carried out according to the process of U.S. Pat. No. 2,310,679 without the presence of an inert solvent. Triglycerides contained in the soybean oil may include, for example, C16 saturated and C18 saturated, mono-unsaturated and poly-unsaturated fatty acids, particularly palmitic, stearic, oleic, linoleic and linolenic acid, with an iodine value of 120-140. The phospholipid-enriched soybean oil is reacted with 30-90 wt %, preferably 50-70 wt %, of ethylene oxide between 90° C. and 180° C., in the presence of a basic catalyst, typically potassium hydroxide, at a pressure between 1 and 5 bar for 60-300 minutes. Small amounts (e.g., 1-4 wt %) glycerol may be added as an initiator. The reaction conditions, such as time and pressure, may be set to obtain a final product comprising 10-200, preferably 20-50 ethylene oxide units. Temperature is preferably maintained below 170° C., preferably at about 160° C., to avoid excessive discoloration. For example, preferred ethoxylated lecithins may be lecithin having 25 moles ethoxylate functional group incorporated therein (having a number average molecular weight (NAVG MW) of about 1000) and/or lecithin having 30 moles ethoxylate functional group incorporated therein (having a NAVG MW of about 1200), although other ethoxylated lecithins may be utilized and the invention should not necessarily be limited to those molar amounts and NAVG MW. Exemplary ethoxylated lecithins that may be used in the exemplary embodiments described herein include, for example, commercially available ethoxylated lecithins such as DP-119/11 (lecithin+25 moles ethoxylate), DP-120/11 (lecithin+30 moles ethoxylate), and other ethoxylated lecithins commercially available from CST Performance Products Corp. in Conroe, Texas.

The ethoxylated lecithins in the exemplary compositions described herein may be present in an effective amount for use as a penetrant, drift reduction agent, soil amendment, or for any other purpose. Specifically, the compositions may have ethoxylated lecithin in an amount of about one percent (1%) by weight of the total composition to about 99.9% by weight of the total composition, preferably between about ten percent (10%) and about ninety percent (90%) by weight of the total composition, more preferably between about twenty percent (20%) and about eighty percent (80%) of the total composition, still more preferably between about thirty percent (30%) and about seventy percent (70%) of the total composition.

The compositions may have a pH ranging from about 3 to about 9, and may incorporate buffers or acidifiers therein to achieve a particular pH. In an exemplary embodiment, an acidifier may be added to the compositions described herein to lower the pH of the resultant compositions. Acidified compositions may have improved efficacy as a penetrant and/or drift reduction agent. Moreover, one or more acidifiers may be used to reduce pH and prevent complexing of the functional components with hard water ions in aqueous compositions. For example, glyphosate, a well-known agricultural herbicide, is known to complex with metal ions. Having a relatively low pH in a hard water aqueous composition prevents or suppresses metal ion complexing with glyphosate.

The ethoxylated lecithins may be added to other components to form mixtures thereof, and may be advantageous as the compositions may not require added surfactants to stabilize the dissolution of the ethoxylated lecithin mixtures into aqueous systems. That is, the ethoxylated lecithin provides the water-dispersion properties of a surfactant without requiring that conventional or other surfactants be added to the composition. Thus, the ethoxylated lecithin mixtures may be utilized in aqueous compositions without the addition of one or more surfactants. As explained above, conventional surfactants increase driftable fines. Accordingly, the absence of conventional surfactant(s) or other surfactants from the composition improves the usefulness of the composition as a drift reduction agent.

However, if desired surfactants may still be utilized, for example, to provide additional stability, and may further be useful depending on other components, such as functional components, contained therein. Any surfactants may be utilized that are effective to stabilize the compositions described herein, including, but not limited to, non-ionic surfactants, anionic surfactants, cationic surfactants and amphoterics. Preferably, non-ionic surfactants, such as Tomadol 1-5 and Tomadol 1-7 ethoxylated alcohols (alcohol ethoxylates from Air Products, formerly Neodol), or combinations thereof, may be utilized so that the surfactants do not interact, complex or otherwise react with charged functional components, such as the pesticides, herbicides, insecticides, fungicides, fertilizers or other like functional components. Other non-ionic surfactants may include alkylphenylethers, polyoxyethylene and polyoxypropylene block co-polymers, alkyl polyglucoside, and other non-ionic surfactants as apparent to one of ordinary skill in the art.

Moreover, the one or more surfactants in the compositions of the exemplary embodiments described herein may have any hydrophilic-lipophilic balance ("HLB") that is useful to the intended application. Some exemplary compositions contain one or more surfactants having a HLB value in a range between about 8-16, preferably 8-13, more preferably between about 10-12, for example, to ensure good stability of the compositions, especially when incorporated added to water for spraying. A plurality of surfactants may be utilized to obtain the desired HLB.

The one or more surfactants may be present in an amount between about five percent (5%) and about forty percent (40%) of the total composition, more preferably between about ten percent (10%) and about thirty (30%) of the total composition, still more preferably between about fifteen (15%) and about twenty percent (20%) of the total composition.

Humectants may further be incorporated into the compositions to slow the drying time of the aqueous droplets that may be sprayed onto agricultural crops, to increase the uptake of functional components therein, and to aid in cold storage of the compositions described herein. For example, a common humectant, diethylene glycol (DEG) may be incorporated into the compositions described herein for this purpose.

Fatty acids may be utilized in the compositions in combination with surfactants to aid in stabilizing the compositions herein. Preferably, the fatty acid includes at least one selected from the group consisting of C8 to C30 fatty acids. Such acids include, but are not limited to, myristic, lauric, palmitic, stearic, oleic, and linoleic acids and mixtures of fatty acids derived from natural sources such as coco, lauryl, palm, soy, cottonseed and tall oil fatty acids, as well as combinations of the aforementioned fatty acids. Most preferably, the fatty acid includes at least one fatty acid whose major content is C18 fatty acids such as soy and tall oil fatty acids. An effective amount of fatty acid, as described herein, may be utilized. Preferably, the fatty acid content is up to about thirty percent (30%) by weight of the total composition. More preferably, the range of fatty acid content is about one percent (1%) to about twenty five percent (25%) by weight. Still more preferably, the range of fatty acid content is about five percent (5%) to about twenty percent (20%) by weight.

Unless otherwise specified, all percentages provided above are in mass/mass (w/w) percent on a dry weight basis. Dry weight refers to the weight of the ingredient(s) making up the material without added water but including ingredient native water such as moisture, which is generally less than 0.1 weight percent for each ingredient.

The composition may be dispersed in water in a volumetric ratio of, for example, about 1:100 to about 1:800. One of more functional components, such as pesticides, herbicides, insecticides, and/or fungicides, may be added, for example, in agriculturally acceptable amounts, such as described in the compositions below.

EXAMPLES

Example 1 (Synthex® L950)

An exemplary embodiment comprises a composition having about 50% by weight of the composition ethoxylated lecithin (DP-120/11), about 30% by weight of the composition tall oil fatty acid, and about 20% by weight of the composition Tomadol 1-5 nonionic surfactant.

Preparation: A water-free mixture was prepared using a 150 mL Pyrex beaker and an overhead stirrer with a 2 inch blade. Each component was added successively, weighed into the beaker mixture while stirring continues to a total weight of the mixture of 100 grams. The order of addition was not important. The mixture was stirred until uniform, free from striations, solids, cloudiness or any other apparent inhomogeneity.

Use/Application: The above mixture was mixed with in a tank with water, pesticide, and possibly fertilizers and other additives. Mixing order can be an issue in the so-called "tank mix." Solid pesticide formulations, such as water-soluble granules (WGs) and dry flowables (DFs), sometimes do not dissolve well except in pure water. The addition of Synthex® L950 may prevent complete dissolution of such pesticide formulations. Therefore, the first addition to the tank preferably was water, followed by any dry formulations which preferably are completely dissolved in the tank water before moving on to any other additives. Synthex® L950 is preferably added last to any tank mix. The use rate for Synthex® L950 was 0.25-0.5% or 1 to 2 quarts per 100 gallons of total tank mix.

Example 2 (Synthex® L940)

Another exemplary embodiment comprises a composition having about 30% by weight of the composition water, about 15% by weight of the composition citric acid, about 5% by weight of the composition DEG, about 10% by weight of the composition Tomadol 1-7 non-ionic surfactant, and about 40% by weight of the composition DP-120/11 ethoxylated lecithin.

Preparation: For this Example 2, the preparation is identical to Example 1 except for the mixing order. In this formulation, mixing order is more important because the addition of Tomadol 1-7, and the DP-120/11 to the water interferes with the dissolution of the citric acid, which is a solid at room temperature. Therefore, the citric acid preferably is fully dissolved in water prior to the addition of these ingredients. DEG may slow or stop the dissolution of the citric acid.

When combining a complex mixture of hydrophobic and hydrophilic compounds, adding them in order from most hydrophobic to most hydrophilic or most hydrophilic to most hydrophobic gives the greatest formulation success. In this case, since complete dissolution of the citric acid is achieved in the pure water component, water preferably is first and citric acid second. Other components, when mixed in the order above, will mix easily. The Tomadol 1-7 promotes dispersion and complete dissolution of the DP-120/11 into the water/citric acid mixture.

Use/Application: Use and application of Synthex® L940 of Example 2 is identical to those described in connection with the Synthex® L950 of Example 1.

To compare the effectiveness of the compositions of the present invention, as embodied in Examples 1 and 2, with other compositions, and to determine the efficacy of the compositions as penetrants and drift reduction agents, formulations of Examples 1 and 2 with water and one or more functional components, such as one or more herbicides, were prepared and their effectiveness as penetrants and drift reduction agents were measured. With respect to the compositions in the bar graphs of FIGS. 1-3: Composition 1 contains the herbicides Touchdown® HT (glyphosate) (Syngenta Group Co.) and Clarity® (dicamba) (BASF) in an amount of 16 oz/ac and 12 oz/ac respectively in about 8.5 gallons (8.5 gallons per acre water carrier volume or 8.5 GPA) water with no adjuvant; Composition 2 contains the same herbicides in about 8.5 GPA water with 0.25% by volume Synthex® PR3410, a non-ethoxylated lecithin-based penetrant, as well as an acidifier and NIS; Composition 3 contains the same herbicides in about 8.5 GPA water with 0.25% by volume Synthex® L950 of Example 1; and Composition 4 contains the same herbicides in about 8.5 GPA water with 0.25% by volume Synthex® L940 of Example 2 and acidifier. Compositions 1-4 are set forth in Table 1 below.

TABLE 1

| Comp. | Herbicide | Use rate/ac | Adjuvant | Use rate |
|---|---|---|---|---|
| 1 | Touchdown ® HT + Clarity ® | 16 oz + 12 oz | None | — |
| 2 | Touchdown ® HT + Clarity ® | 16 oz + 12 oz | Synthex ® PR3410 | 0.25% |
| 3 | Touchdown ® HT + Clarity ® | 16 oz + 12 oz | Synthex ® L950 | 0.25% |
| 4 | Touchdown ® HT + Clarity ® | 16 oz + 12 oz | Synthex ® L940 | 0.25% |

Figure 1:
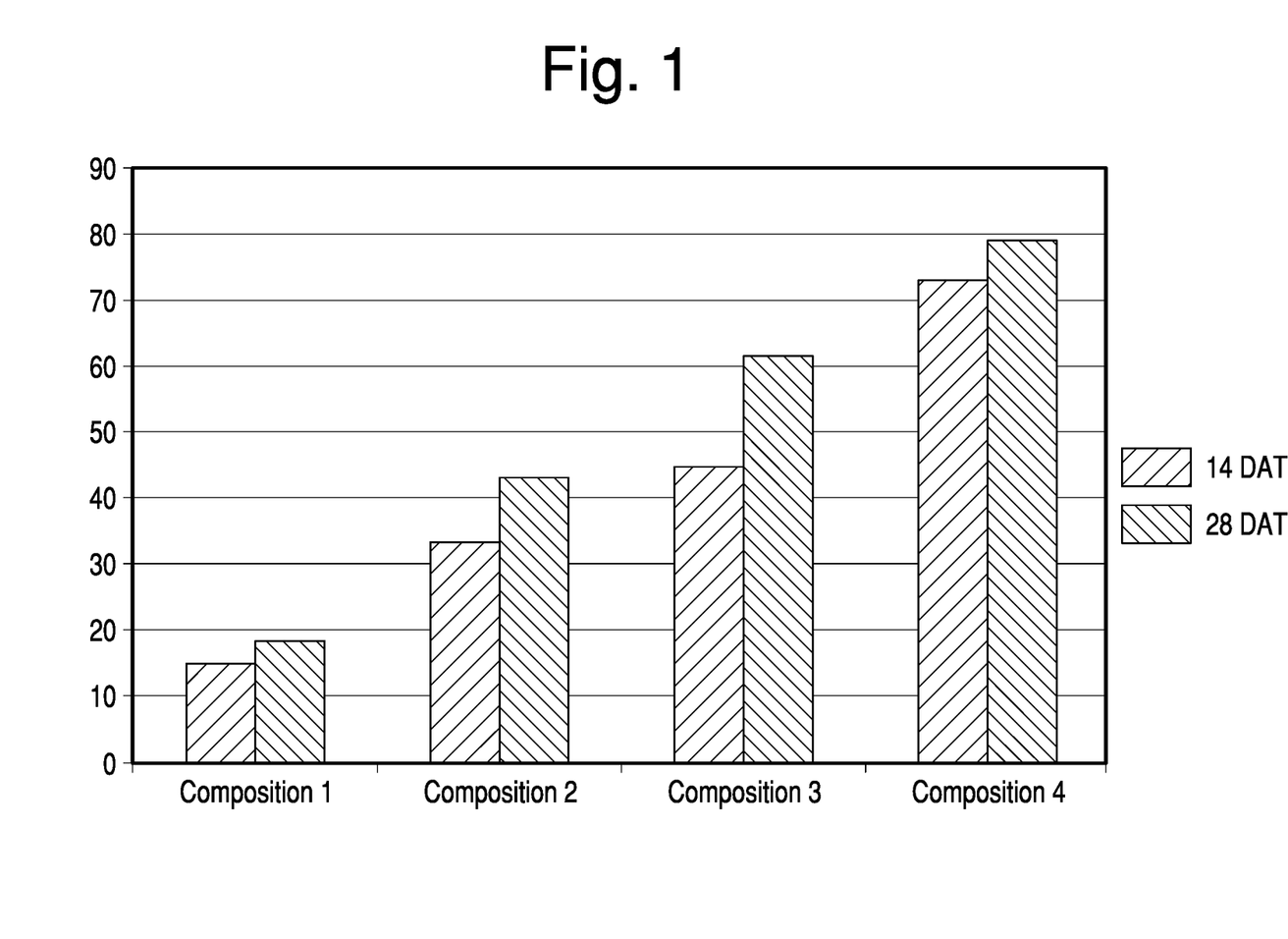
FIG. 1 illustrates a bar graph representing comparison studies of the efficacy of inventive and non-inventive compositions in flax control.
Figure 2:
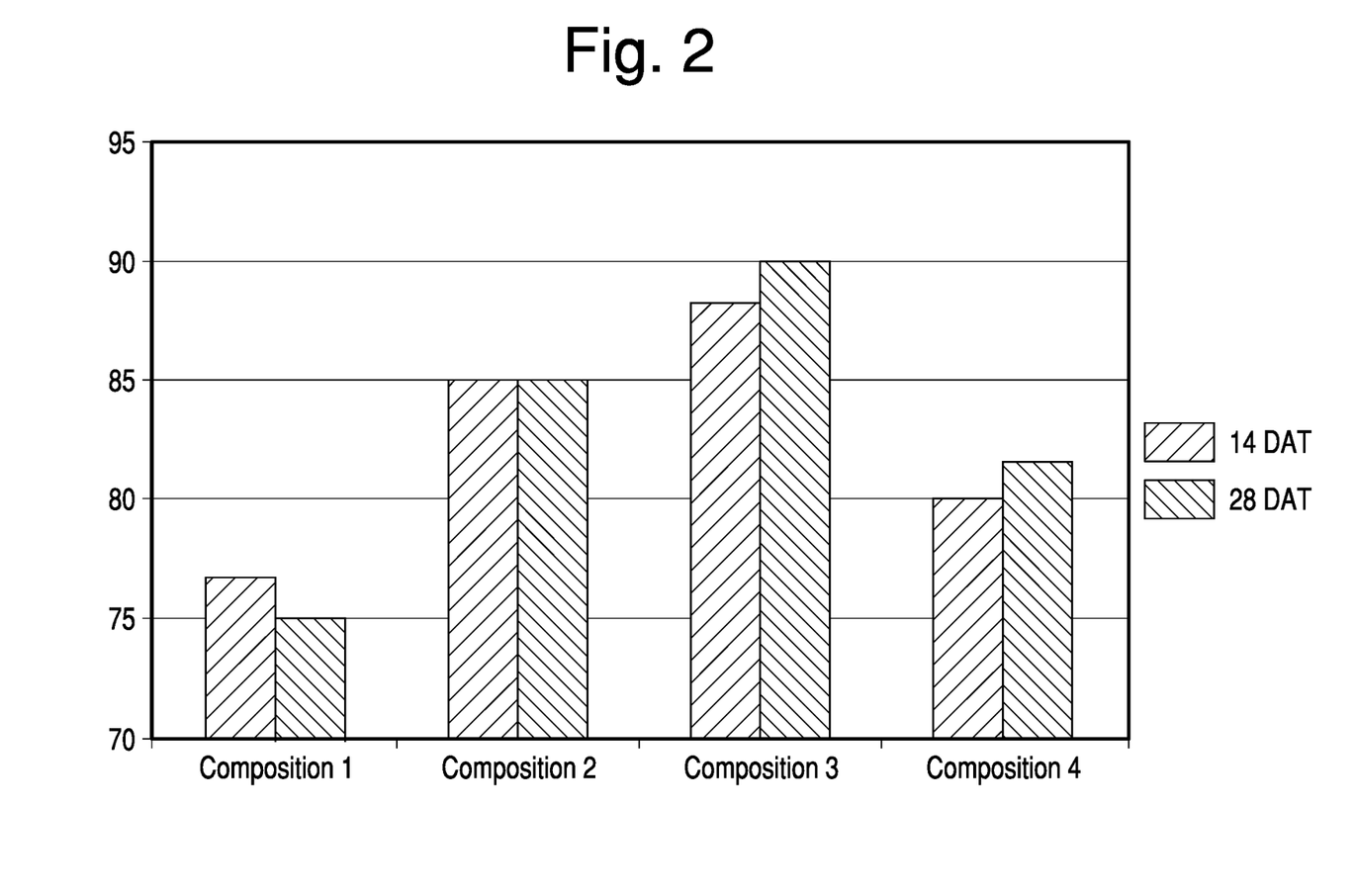
FIG. 2 illustrates a bar graph representing comparison studies of the efficacy of inventive and non-inventive compositions for pigweed control.
Figure 3:
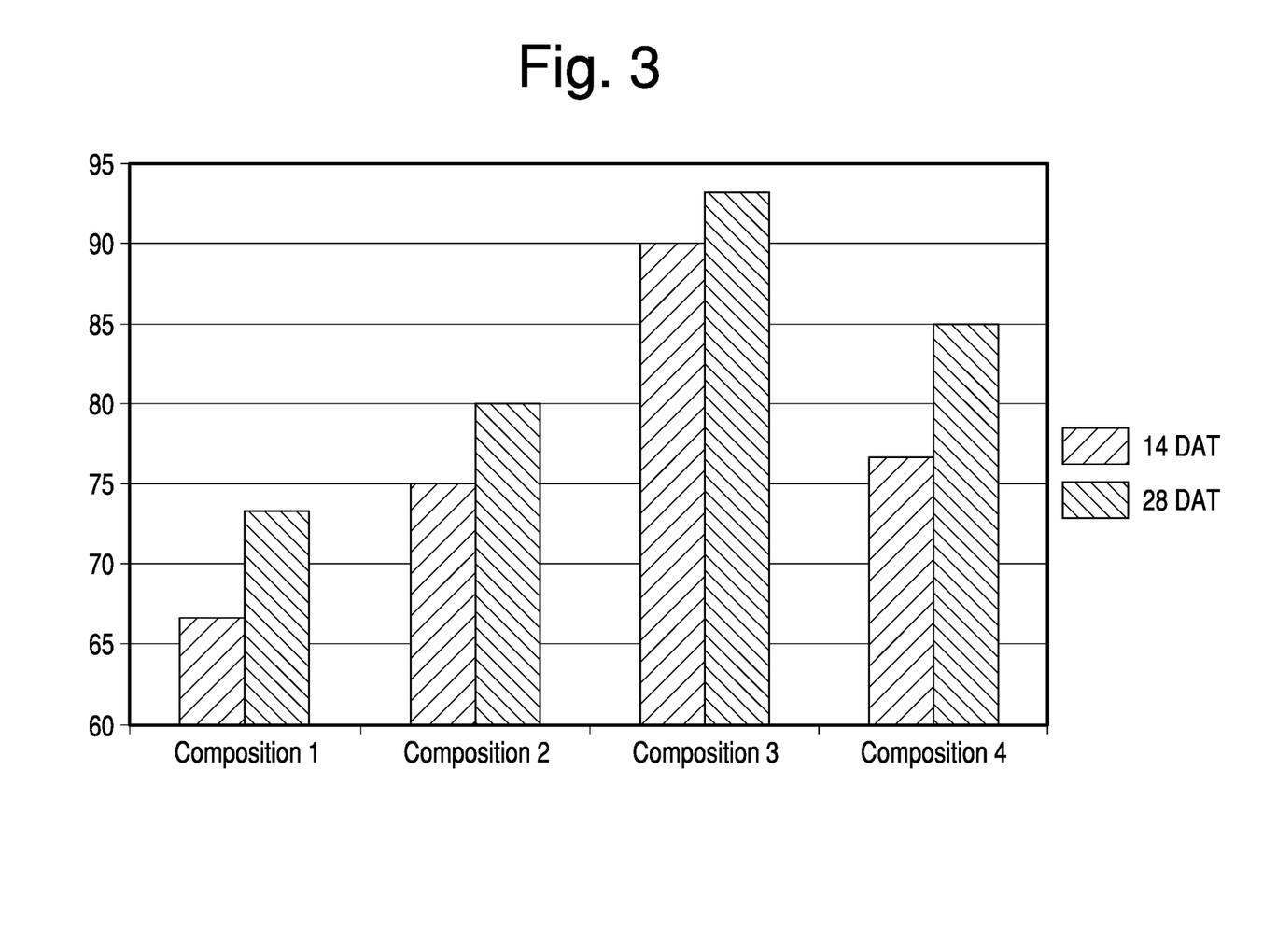
FIG. 3 illustrates a bar graph representing comparison studies of the efficacy of inventive and non-inventive compositions for sunflower control.

FIGS. 1-3 illustrate the efficacy of the compositions of the present invention as a penetrant for flax control (FIG. 1), pigweed control (FIG. 2), and sunflower control (FIG. 3) at 14 and 28 days after treatment, showing comparable or better percent control results of the Compositions 3 and 4 of the present invention when compared to Compositions 1 and 2.

Figure 4:
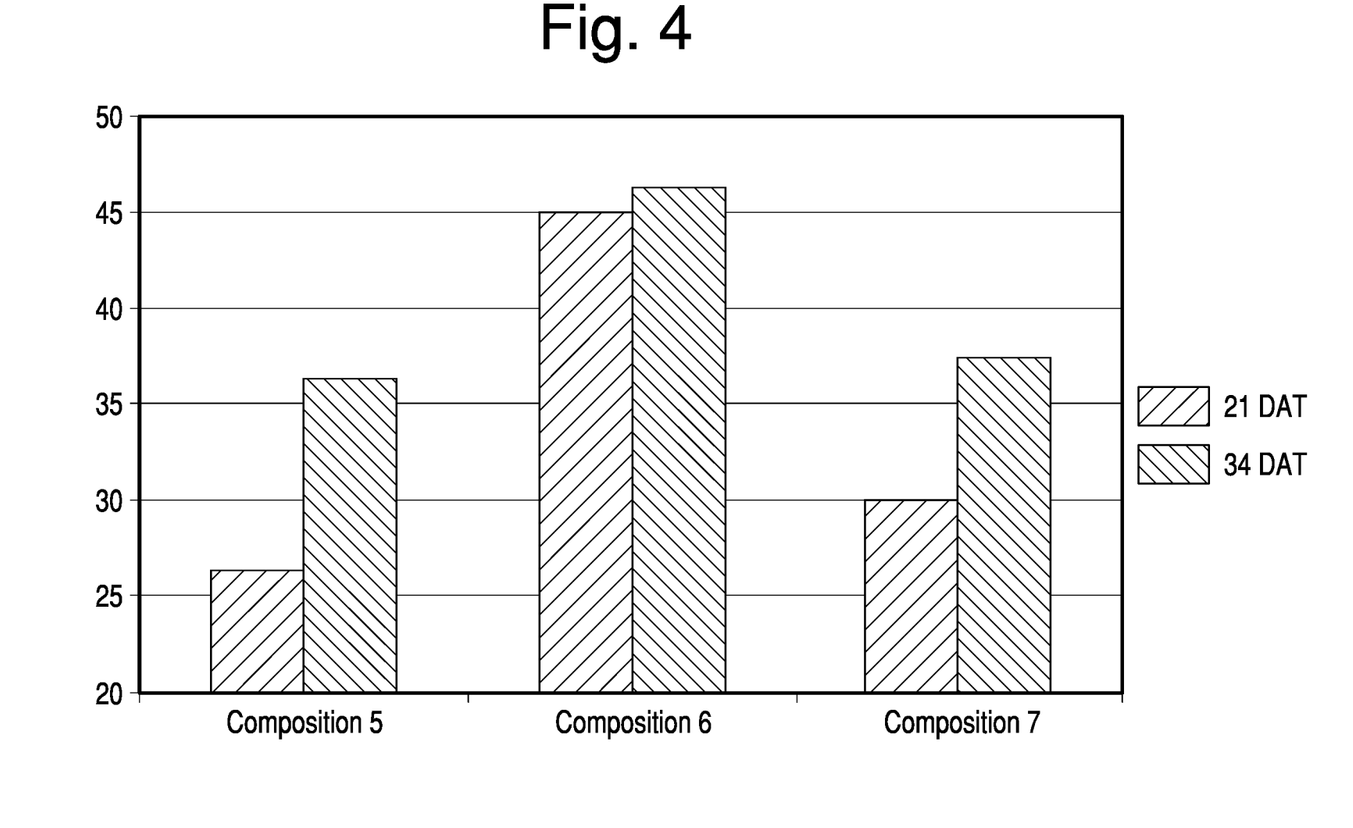
FIG. 4 illustrates a bar graph representing comparison studies of the efficacy of inventive and non-inventive compositions for common lambsquarters control.
Figure 5:
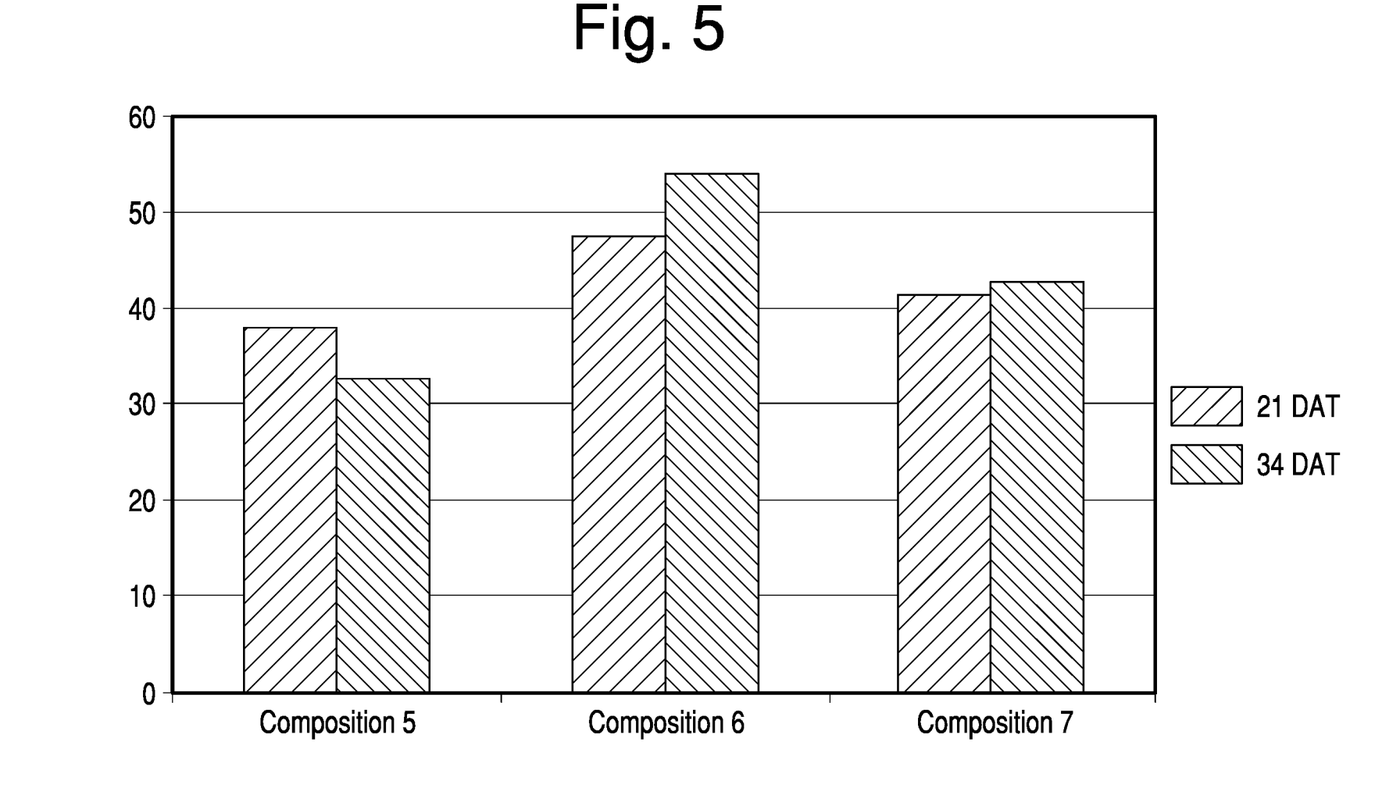
FIG. 5 illustrates a bar graph showing the efficacy of known compositions and compositions of embodiments of the present invention for wild oat control.

FIGS. 4 and 5 relate to the following three compositions reported in Table 2 below: Composition 5 contains the herbicide GoldSky® (Dow Agrosciences, LLC) a well-known herbicide used on wheat, in an amount of about 10 oz/ac in about 10 gallons of water with no adjuvant; Composition 6 contains the same herbicide in about 10 GPA water with 0.25% by volume Synthex® L950 of Example 1; and Composition 7 contains the same herbicide in about 10 GPA water with 0.25% by volume Surfiex® PAE 970, a well-known surfactant blend composition that is typically used with GoldSky® herbicide. Compositions 5-7 are set forth in Table 2 below.

TABLE 2

| Comp. (10 gpa) | Herbicide | Use rate | Adjuvant | Use Rate |
|---|---|---|---|---|
| 5 | GoldSky ® | 10 oz/A | None | — |
| 6 | GoldSky ® | 10 oz/A | Synthex ® L950 | 0.25% v/v |
| 7 | GoldSky ® | 10 oz/A | Surflex PAE970 | 0.25% v/v |

FIGS. 4 and 5 illustrate the efficacy of inventive Composition 6 as a penetrant for common lambsquarter percent control (FIG. 4) and wild oat percent control (FIG. 5) at 21 and 34 days after treatment, showing better results of the inventive Composition 6 when compared to Compositions 5 and 7.

Figure 6:
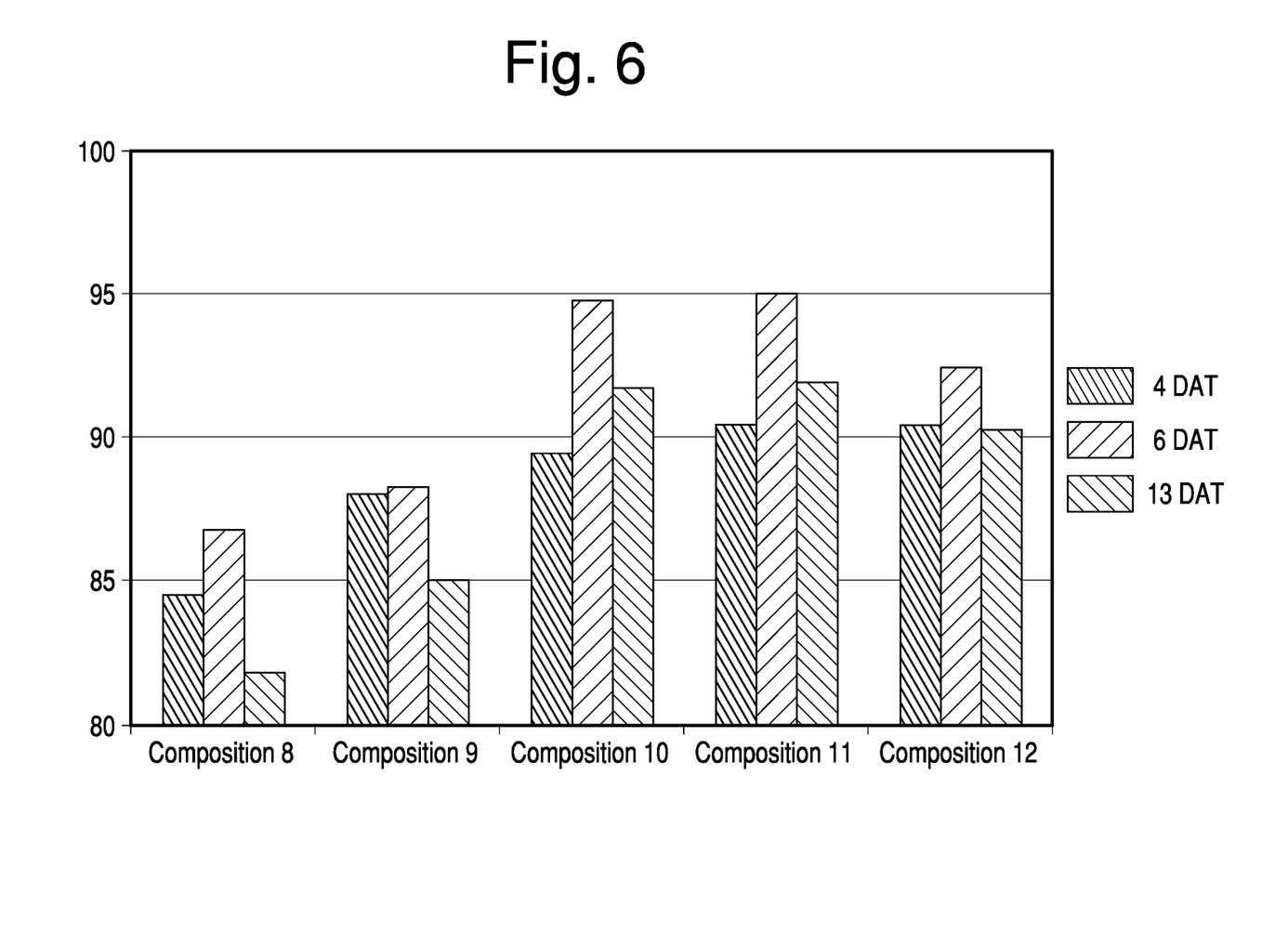
FIG. 6 illustrates a bar graph representing comparison studies of the efficacy of inventive and non-inventive compositions for palmer amaranth control.

FIG. 6 relates to the following five compositions reported below in Table 3: Composition 8 contains the herbicide Liberty® 280 SL (Bayer) (active glufosinate), a well-known herbicide typically used on cotton, in an amount of about 29 oz/ac in about 15 GPA water with no adjuvant; Composition 9 contains the same herbicide Liberty® 280 SL in about 15 GPA water with 3 lbs per acre ammonium sulfate; Composition 10 contains the same herbicide Liberty® 280 SL in about 15 GPA water with 0.25% by volume Synthex® L950 of Example 1; Composition 11 contains the same herbicide Liberty® 280 SL in about 15 GPA water with 0.25% by volume Synthex® L940 of Example 2; and Composition 12 contains the same herbicide in about 15 GPA water with 0.25% by volume Synthex® NCA 34 (a blend of ammonium sulfate and non-ionic surfactant). Compositions 8-12 are set forth below in Table 3.

TABLE 3

| Comp. | Herbicide | Use rate | Adjuvant | Use Rate |
|---|---|---|---|---|
| 8 | Liberty ® 280SL | 29 oz/A | None | — |
| 9 | Liberty ® 280SL | 29 oz/A | Ammonium sulfate | 3 lb/A |
| 10 | Liberty ® 280SL | 29 oz/A | Synthex ® L950 | 0.25% v/v |
| 11 | Liberty ® 280SL | 29 oz/A | Synthex ® L940 | 0.25% v/v |
| 12 | Liberty ® 280SL | 29 oz/A | Synthex ® NCA34 | 0.25% v/v |

FIG. 6 illustrates the efficacy of the inventive Compositions 10 and 11 for percent control of palmer amaranth at 4, 6 and 13 days after treatment, showing comparable or better results of the inventive Compositions 10 and 11 compared to Compositions 8, 9 and 12.

FIGS. 7-12 illustrate efficacy of the present invention compared to comparison compositions as a drift reduction agent. Specifically, compositions 13-18 were prepared and sprayed from an XR11003 nozzle in a wind tunnel having a wind speed at 15 mph, and droplet sizes of the compositions were measured using a Sympatec Helos Vario KR particle size analyzer.

Table 4 below sets forth five compositions of Roundup PowerMax® herbicide (RU PowerMax, a glyphosate-based herbicide) with various adjuvants as specified therein. Composition 13 contains about 65 mL/gallon RU PowerMax® with no adjuvant; Composition 14 contains about 65 mL/gallon RU PowerMax® with about 9.5 mL/gallon (0.25% v/v) Synthex® L750, a known non-ethoxylated lecithin-based adjuvant; Composition 15 contains the same amount of RU PowerMax® with about 0.25% v/v Synthex® L754, a known non-ethoxylated lecithin-based adjuvant plus an acidifier; Composition 16 contains the same amount of RU PowerMax® with about 0.25% v/v Liberate™, a known non-ethoxylated lecithin-based adjuvant; Composition 17 contains the same amount of RU PowerMax® with about 0.25% v/v Liberate™ and an acidifier; and Composition 18 contains the same amount of RU PowerMax® with about 0.25% v/v Synthex® L950 composition of the present invention. Compositions 13-18 are set forth in Table 4 below.

TABLE 4

| Comp. | Treatment | Rate (mL per gallon) |
|---|---|---|
| 13 | RU PowerMax ® alone | 65 mL (1.7% v/v) |
| 14 | RU PowerMax ® + EXT695 | 65 mL (1.7% v/v) + 9.5 mL (0.25% v/v) |
| 15 | RU PowerMax ® + EXT908 | 65 mL (1.7% v/v) + 9.5 mL (0.25% v/v) |
| 16 | RU PowerMax ® + EXT595 | 65 mL (1.7% v/v) + 9.5 mL (0.25% v/v) |
| 17 | RU PowerMax ® + EXT909 | 65 mL (1.7% v/v) + 9.5 mL (0.25% v/v) |
| 18 | RU PowerMax ® + EXT914 | 65 mL (1.7% v/v) + 9.5 mL (0.25% v/v) |

Figure 7:
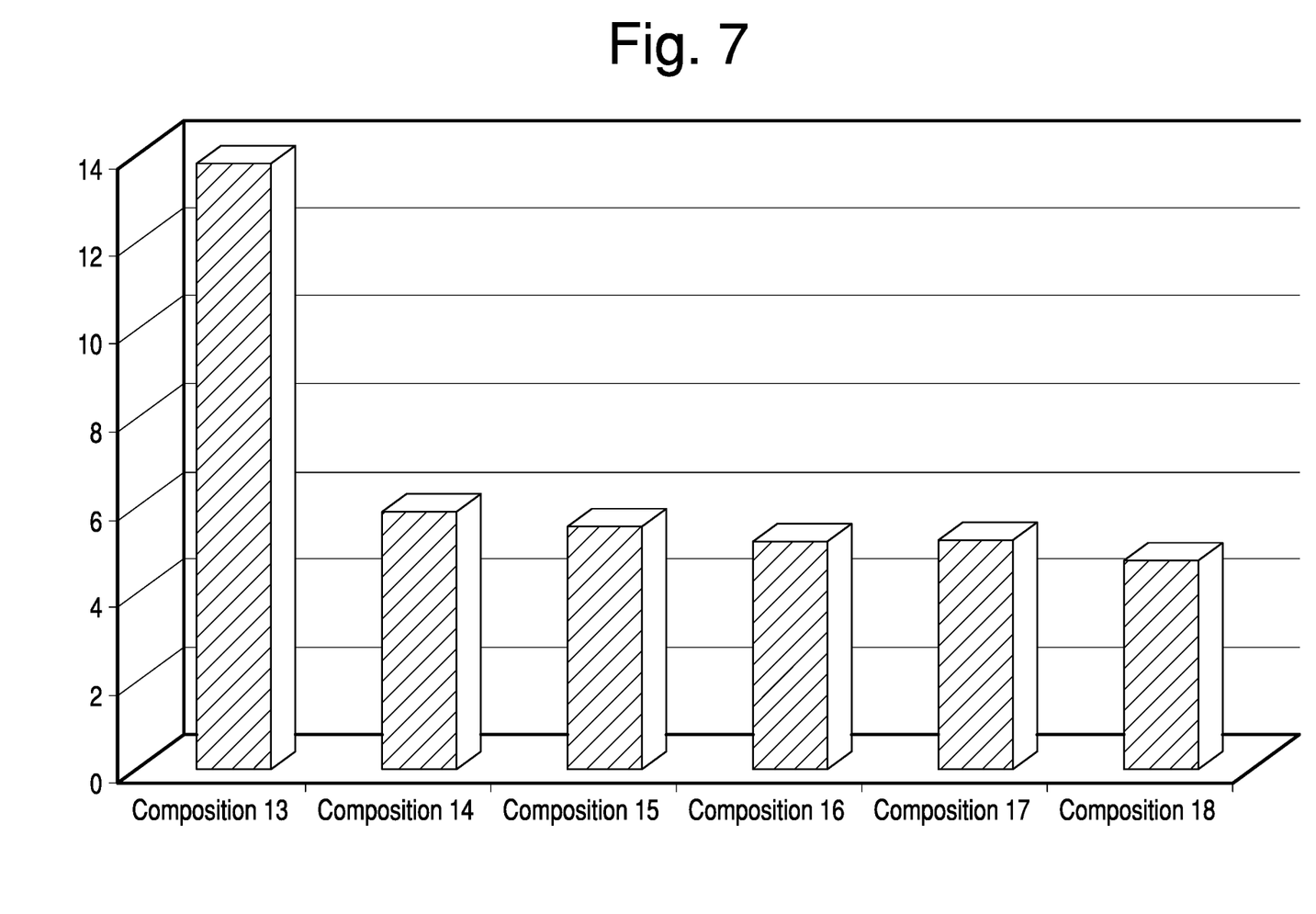
FIG. 7 illustrates a bar graph showing the percentage of droplet sizes of the compositions less than about 105 μm, representing the droplet sizes most susceptible to drift.
Figure 8:
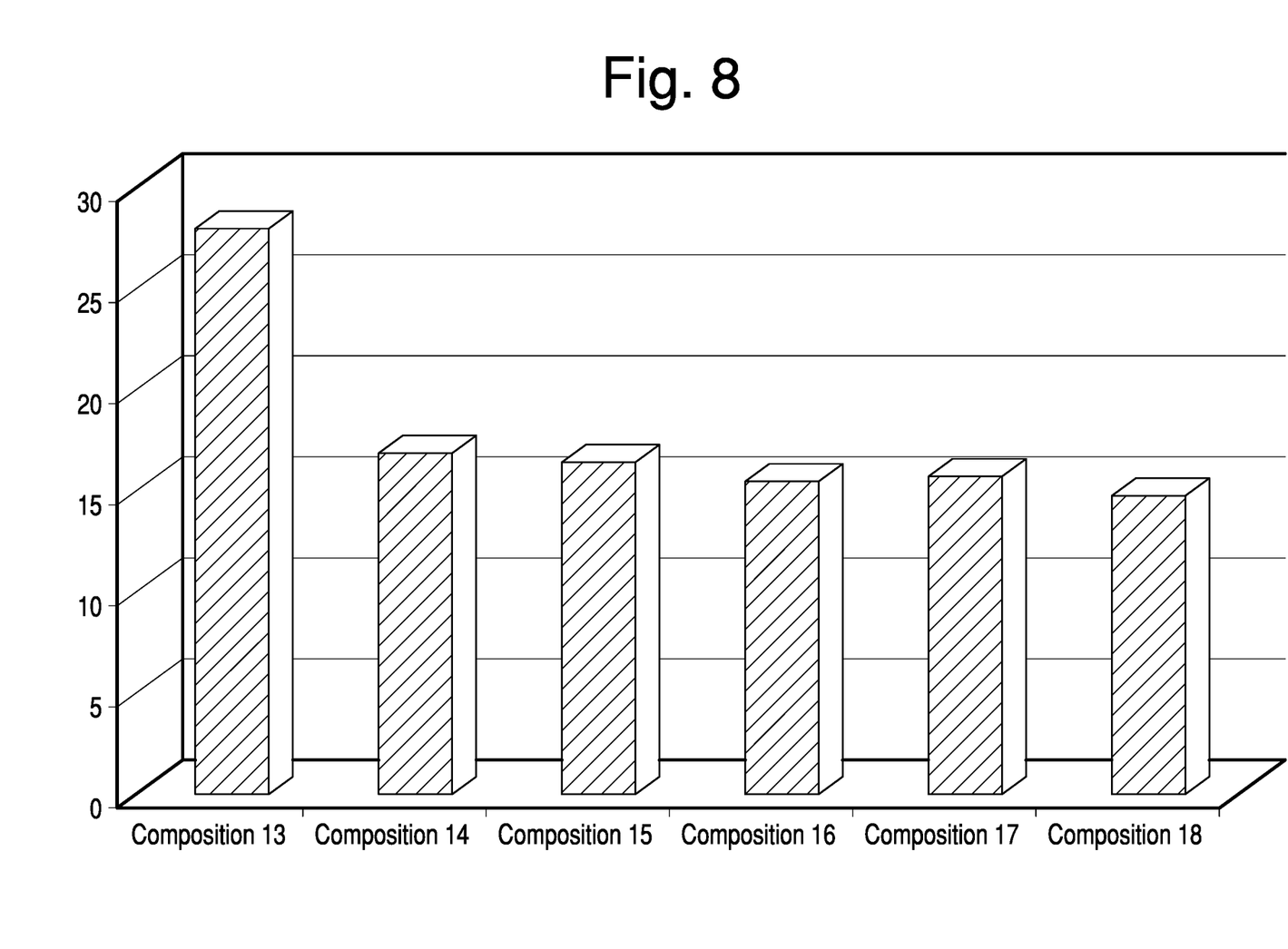
FIG. 8 illustrates a bar graph showing the percentage of droplet sizes of the compositions less than about 150 μm.
Figure 9:
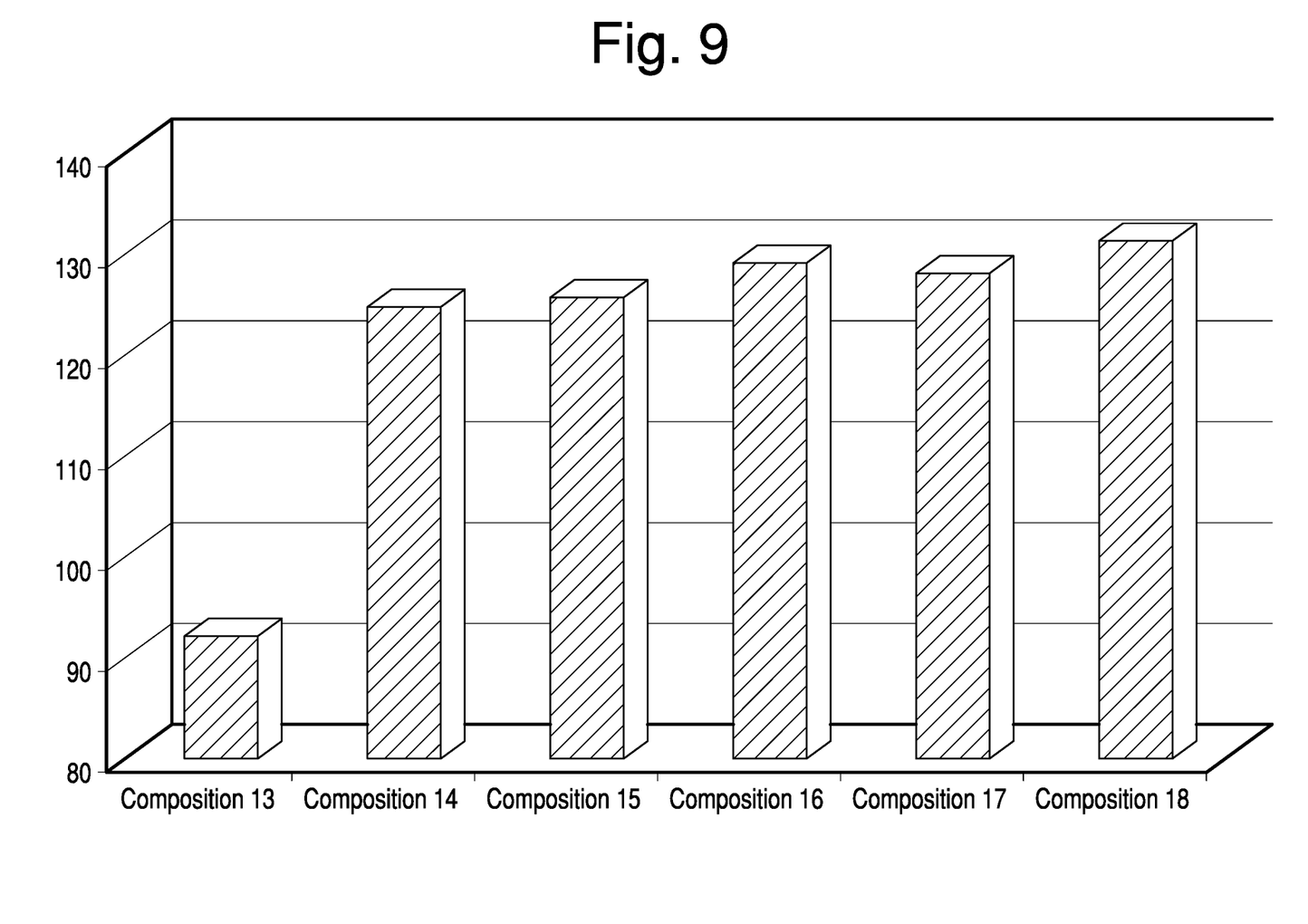
FIG. 9 illustrates a bar graph showing the average droplet sizes of the compositions in the first 10% of volume sprayed.
Figure 10:
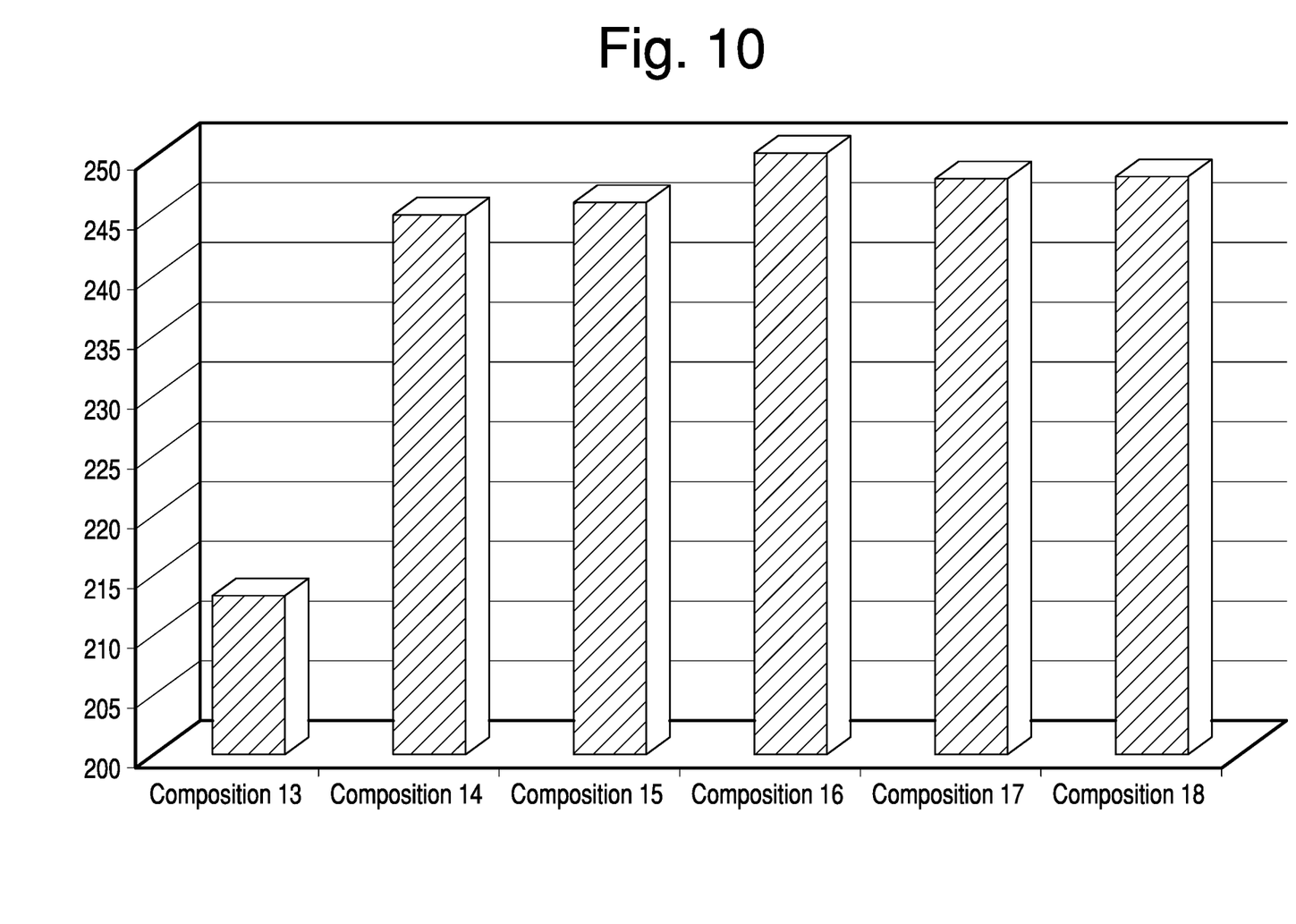
FIG. 10 illustrates a bar graph showing the average droplet sizes of the compositions in the first 50% of volume sprayed.
Figure 11:
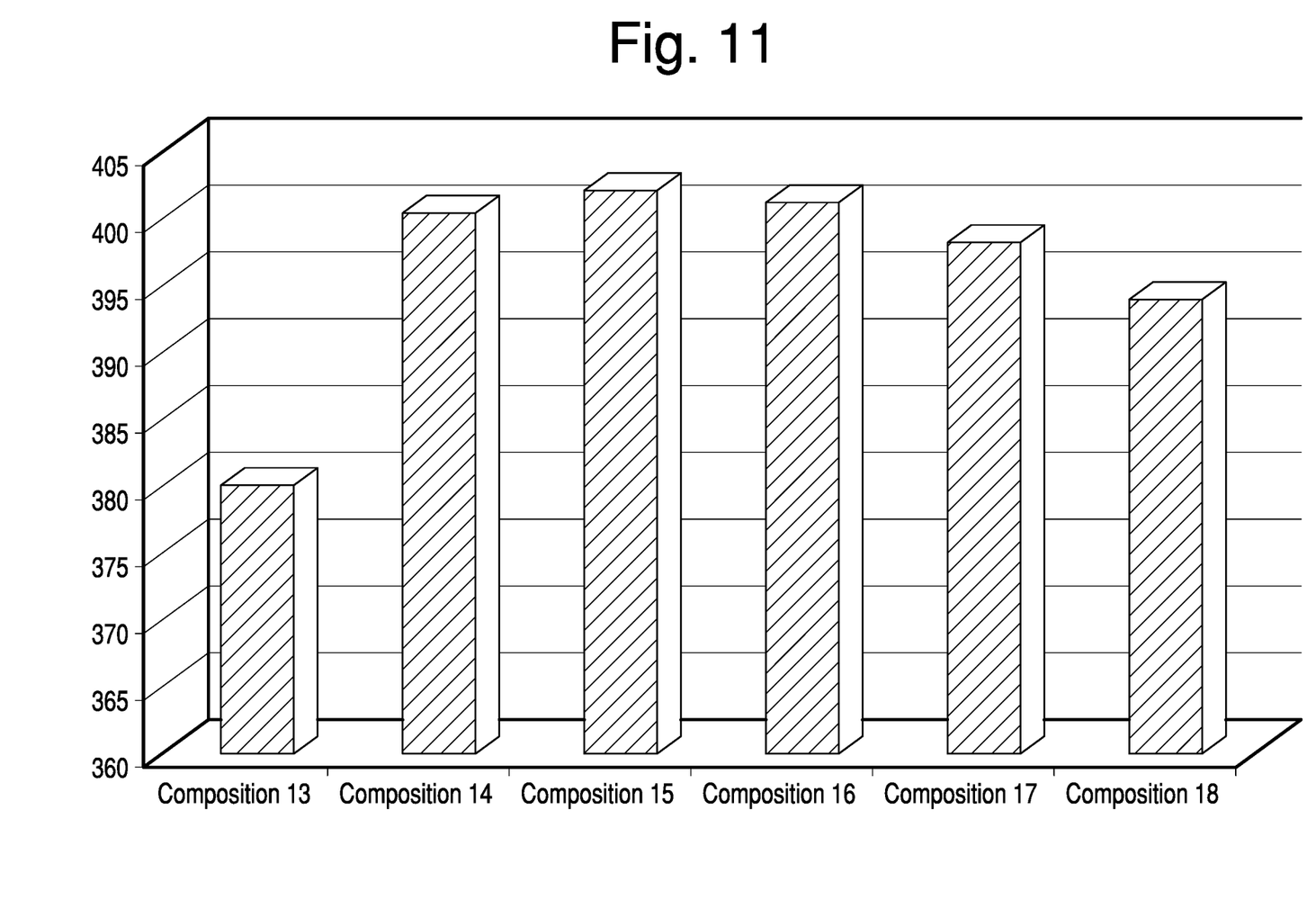
FIG. 11 illustrates a bar graph showing the average droplet sizes of the compositions in the first 90% of volume sprayed.
Figure 12:
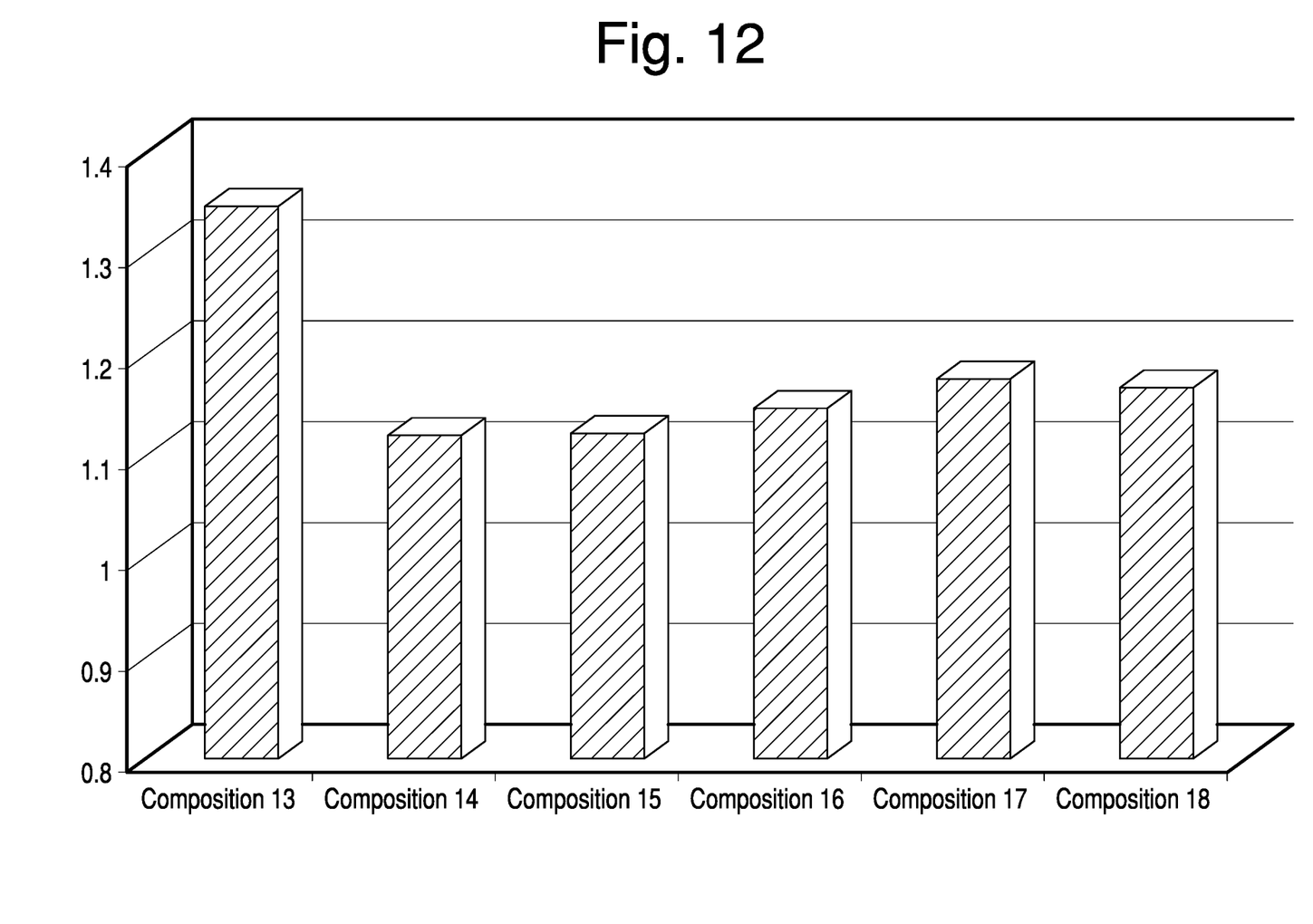
FIG. 12 illustrates a bar graph showing the relative span of droplet sizes of the compositions relative to a normalized preferred droplet size.

FIG. 7 illustrates the percentage of the entire volume sprayed of the compositions that had droplet sizes less than about 105 μm, which represents the droplet sizes that are likely most susceptible to drift. FIG. 8 illustrates the percentage of the entire volume sprayed of the compositions that had droplet sizes less than about 150 μm. FIG. 9 illustrates the average droplet sizes (microns) of the compositions in the first 10% of the total volume sprayed. FIG. 10 illustrates the average droplet sizes (microns) of the compositions in the 50% of the total volume sprayed. FIG. 11 illustrates the average droplet sizes (microns) of the compositions in the 90% of the total volume sprayed. Finally, FIG. 12 illustrates the relative span of droplet sizes relative to a normalized preferred droplet size. FIGS. 7-12 illustrate comparable or better results of the composition of the present invention compared to compositions not having ethoxylated lecithin.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

What is claimed is:

1. An agricultural composition system, comprising:
    ethoxylated lecithin;
    ethoxylated soybean oil;
    a surfactant; and
    an acid, wherein the ethoxylated lecithin is present at about 10% to about 90% by weight based on the total weight of the system.

2. The system of claim 1, wherein the surfactant is selected from the group consisting of non-ionic surfactants, anionic surfactants, cationic surfactants and amphoterics.

3. The system of claim 2, wherein the non-ionic surfactant is present in an amount of about 5 weight percent to about 40 weight percent based on the total weight of the system.

4. The system of claim 2, wherein the non-ionic surfactant is present in an amount of about 10 weight percent and about 30 weight percent based on the total weight of the system.

5. The system of claim 2, wherein the non-ionic surfactant comprises an ethoxylated alcohol.

6. The system of claim 2, wherein the non-ionic surfactant has a hydrophilic-lipophilic balance (HLB) of between about 8-16.

7. The system of claim 1, wherein a plurality of surfactants are used to obtain a hydrophilic-lipophilic balance (HLB) of between about 8-16.

8. The system of claim 1, wherein the acid comprises a fatty acid.

9. The system of claim 8, wherein the fatty acid is a tall oil fatty acid.

10. The system of claim 1, wherein the acid is present in an amount of about 1 weight percent to about 25 weight percent based on the total weight of the system.

11. The system of claim 1, wherein the acid is present in an amount of about 5 weight percent to about 20 weight percent based on the total weight of the system.

12. The system of claim 1, wherein the pH has a range from 3 to 9.

13. The system of claim 1, wherein the non-ionic surfactant has a hydrophilic-lipophilic balance (HLB) of between about 8-16.

14. The system of claim 1, further comprising a humectant.

15. The system of claim 14, wherein the humectant comprises diethylene glycol (DEG).

16. The system of claim 1, wherein the pH has a range from about 3 to about 9.

17. A method for applying an agricultural mixture, comprising the steps of
combining the system of claim 1 and any one of a pesticide, an insecticide, an herbicide, a fungicide, a fertilizer, or combinations thereof to from a mixture; and
applying the mixture to crops and/or soils.

18. The method of claim 17, wherein the applying step comprises spraying the mixture.

19. The method of claim 17, wherein the combining step further include the addition of water.

20. The method of claim 17, further comprising the step of dissolving the pesticide, an insecticide, an herbicide, a fungicide, a fertilizer, or combinations thereof in water before the combining step.

21. A herbicidal formulation, comprising:
an adjuvant including ethoxylated lecithin and ethoxylated soybean oil, wherein the ethoxylated lecithin is present at about 10% to about 90% by weight based on the total weight of the adjuvant; and
a herbicidal functional component.

22. The herbicidal formulation of claim 21, wherein the herbicidal functional component comprises one of glyphosate, glufosinate and dicamba.

23. The herbicidal formulation of claim 22, wherein the herbicidal functional component is glufosinate.

* * * * *